United States Patent [19]

Takeuchi

[11] Patent Number: 4,684,002

[45] Date of Patent: Aug. 4, 1987

[54] DEVICE FOR ADJUSTING A CLEARANCE OF A TWIN CLUTCH

[75] Inventor: Hiroshi Takeuchi, Osaka, Japan

[73] Assignee: Kabushiki Kaisha Daikin Seisakusho, Osaka, Japan

[21] Appl. No.: 791,825

[22] Filed: Oct. 28, 1985

[30] Foreign Application Priority Data

Oct. 31, 1984 [JP] Japan ............ 59-166352[U]

[51] Int. Cl.⁴ ............................................ F16D 13/54
[52] U.S. Cl. ............................ 192/70.25; 192/111 A
[58] Field of Search ................. 192/70.25, 111 A; 188/71.8

[56] References Cited

U.S. PATENT DOCUMENTS 2,536,269  1/1951  Driscoll ............. 192/111 A X
4,339,023  7/1982  Maycock ............ 192/70.25

Primary Examiner—Carl D. Friedman
Attorney, Agent, or Firm—Armstrong, Nikaido, Marmelstein & Kubovcik

[57] ABSTRACT

A device for adjusting a clearance of a twin clutch comprises a flywheel; a pressure plate; two clutch discs interposed between the flywheel and the pressure plate; an intermediate plate disposed between the clutch disc; a stopper pin parallel to a clutch engaging and disengaging direction; a stopper spring associated to the intermediate plate for connecting the stopper pin to a radially outer portion of the intermediate plate; and a support member opposed to the flywheel with the stopper pin therebetween; said stopper spring being so adapted that it allows a movement of the stopper pin toward the support member relatively to the intermediate plate, and prevents a movement of the stopper pin in the opposite direction relatively to the intermediate plate.

5 Claims, 8 Drawing Figures

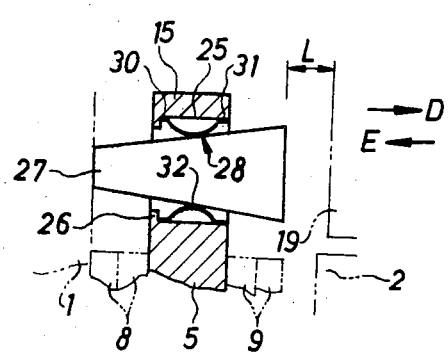
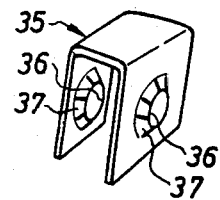
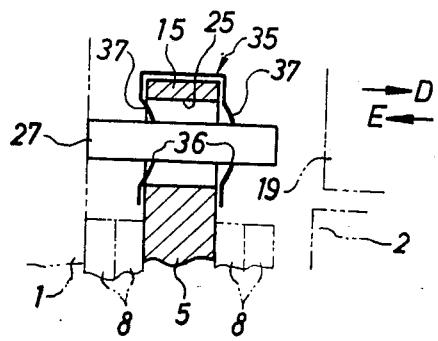
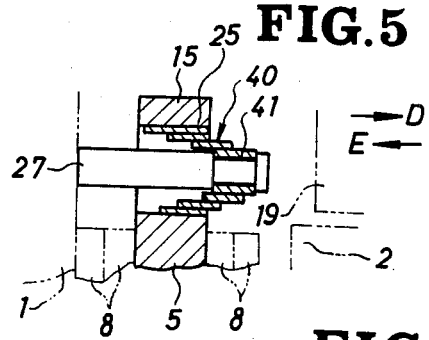
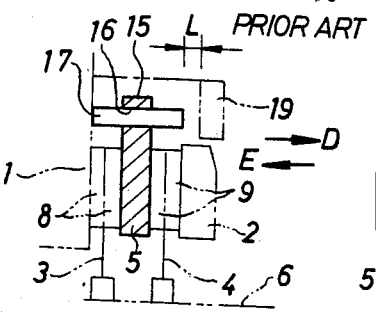
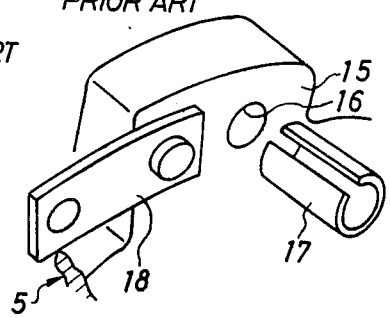

4,684,002

DEVICE FOR ADJUSTING A CLEARANCE OF A TWIN CLUTCH

BACKGROUND AND SUMMARY OF THE INVENTION

The present invention relates to a device for adjusting a clearance of a twin clutch, in which two clutch discs are disposed with an intermediate plate therebetween.

In a known twin clutch, shown in FIG. 7, two clutch disc 3 and 4 are disposed between a flywheel 1 and a pressure plate 2 with an intermediate plate 5 therebetween. These members are of annular shapes and are disposed concentrically to an output shaft 6, respectively. The clutch discs 3 and 4 are provided at the radially outer portions with friction facings 8 and 9, and are connected at radially inner hubs to the output shaft 6, respectively. An engaging-releasing mechanism (not shown), such as a diaphragm spring, is connected to the pressure plate 2. In the engaging operation of the clutch, the mechanism forces the pressure plate 2 so that the pressure plate 2 may press the facings 8 and 9 against the flywheel 1 and the intermediate plate 5.

The intermediate plate 5 is provided with a plurality of outer peripheral projections 15. Each projection 15 is provided with a hole 16 parallel to the output shaft 6. A stopper pin 17 is fitted into the hole 16.

As shown in FIG. 8, each stopper pin 17 is formed by a cylindrical spring member having one axially extending slit, and is elastically compressively fitted into the hole 16. The projections 15 are connected to a flywheel ring 19 through elastic straps 18, so that the intermediate plate 5 may be forced in a clutch disengaging direction D, shown in FIG. 7, by the straps 18. The flywheel ring 19 is integrally formed with the flywheel 1, and is arranged at the opposite side to the flywheel 1 with the projections 15 therebetween. In the illustrated clutch engaged condition, the stopper pins 17 contact the flywheel 1, and an axial space L is formed between each stopper pin 17 and a flywheel ring 19.

According to the above structure, when the pressing force by the pressure plate 2 to the facing 9 is released, the facing 9 moves away from the pressure plate 2 and the intermediate plate 5, and the intermediate plate 5 is moved in the disengaging direction D by the elastic straps 18 to release the pressing force applied against the facing 8, so that the clutch disengages. In this operation, the intermediate plate 5 moved in the direction D stops at a position at which the stopper pins 17 contact the flywheel ring 19, so that the intermediate plate 5 does not move excessively toward the pressure plate 2. Therefore, in the disengaging operation, the intermediate plate 5 is not pressed to the facing 9, and thus, a torque is not transmitted through the intermediate plate 5 and the clutch disc 4 to the output shaft 6.

When the facing 8 wears to some extent after a long use, the position of the intermediate plate 5 in the engaged condition moves toward the flywheel 1. In this case, after the stopper pins 17 contact the flywheel 1, the intermediate plate 5 is further forced by the pressure plate 2, and thus, a sliding occurs between the inner peripheral surfaces of the holes 16 and the stopper pins 17, so that the intermediate plate 5 moves in an engaging direction E with respect to the stopper pins 17.

However, in the above structures, there is a relatively large resistance between the inner surface of the holes 16 and the stopper pins 17 when the intermediate plate 5 moves in accordance with the wear of the facing 8, so that the pressing force applied from the pressure plate 2 through the intermediate plate 5 to the facing 8 is reduced by the above frictional resistance. Therefore, it is difficult to press the facing 8 onto the flywheel 1 by a sufficient force, and thus, it is difficult to transmit a sufficiently large torque from the flywheel 1 to the clutch disc 3.

Further, it is difficult to set or adjust the frictional force between the inner surface of the holes 16 and the stopper pins 17 at an intended value. If the frictional force is too small, there is such a problem that the intermediate plate 5 moves in the disengaging direction D and is pressed to the facing 9 during the disengaging operation, even after the stopper pins 17 contact the flywheel ring 19. If the frictional force is too large, said problem, i.e. the reduction of the pressing force for the facing in the engaging oeration, becomes remarkable.

Accordingly, it is an object of the present invention to provide an improved structure, overcoming the above problem.

According to the present invention, a device for adjusting a clearance of a twin clutch comprises a flywheel; a pressure plate; two clutch discs interposed between the flywheel and the pressure plate; an intermediate plate disposed between the clutch discs; a stopper pin parallel to a clutch engaging and disengaging direction; a stopper spring associated to the intermediate plate for connecting the stopper pin to a radialy outer portion of the intermediate plate; and a support member opposed to the flywheel with the stopper pin therebetween; said stopper spring being so adapted that it allows a movement of the stopper pin toward the support member relatively to the intermediate plate, and prevents a movement of the stopper pin in the opposite direction relatively to the intermediate plate.

According to the above structure, the intermediate plate and the stopper pin is strongly connected together by means of a stopper spring in the clutch disengaging operation, so that the intermediate plate does not move toward the pressure plate after the stopper pin contacts the support member. Therefore, in the disengaging operation, the intermediate plate is not pressed to the facing at the pressure plate side.

When the facings wear, the intermediate plate can move smoothly toward the flywheel, even after the stopper pin contact the flywheel in the engaging operation, and there is not large frictional resistance between the intermediate plate and the stopper pin. Therefore, the pressing force applied by the intermediate plate to the facing is not largely reduced by the resistance, and thus, the facing is pressed to the flywheel by a sufficiently large force.

Other and further objects, features and advantages of the invention will appear more fully from the following description of the preferred embodiments of the invention.

BRIEF DESCRIPTION OF THE DRAWINGS

FIG. 1 is a schematic sectional view of an embodiment of the invention;

FIG. 2 is a schematic perspective view of a spring in FIG. 1;

FIG. 3 is a schematic sectional view of a second embodiment of the invention;

FIG. 4 is a schematic perspective view of a spring in FIG. 3;

FIG. 5 is a schematic sectional view of a third embodiment of the invention;

FIG. 6 is a schematic perspective view of a spring in FIG. 6;

FIG. 7 is a schematic sectional view of a known structure; and

FIG. 8 is a schematic perspective view of the structure in FIG. 7.

DETAILED DESCRIPTION OF THE PREFERRED EMBODIMENTS

Referring to FIGS. 1 to 6, members and parts corresponding to those in FIGS. 7 and 8 bear same reference numbers as those in FIGS. 7 and 8, and those parts and members will not be detailed hereinafter.

Referring to FIG. 1, outer peripheral projections 15 of an intermediate plate 5 are provided with holes 25 parallel to an output shaft 6 (FIG. 7). A radially inward flange 26 is formed at an end, adjacent to a flywheel 1, of the inner peripheral surface of each hole 25. Each hole 25 has a constant diameter through its whole length, except for the end surrounded by the flange 26. The stopper pins 27 are concentrically assembled into the holes 25, respectively. The pins 27 are provided with tapered outer peripheral surfaces, of which diameters become smaller toward a flywheel ring 19 (i.e. support member).

Stopper springs 28 are disposed between the inner surfaces of the holes 25 and the pins 27, respectively. As shown in FIG. 2. Each spring 28 is of cylindrical shape. Both ends 30 and 31 have same and large diameters, and an axially middle portion 32 has a small diameter. The middle portion 32 is curvedly concaves in an axial section, and is provided with circumferentially spaced slits. As shown in FIG. 1, the curved middle portion 32 is elastically pressed to the outer peripheral surface of the pin 27. In other words, the middle portion 32 is elastically and radially outwardly deflected by pin 27 inserted into the spring 28. Both ends 30 and 31 of the spring 28 are fitted into the hole 25, and the end 30 contacts the end, opposite to the flywheel 1, of the flange 26.

In order to move the intermediate plate 5 in the disengaging direction D relatively to the pins 27, it is necessary to move the springs 28 toward the ends of the large diameter of the pins 27, and thus, a large force is required to radially and elastically enlarge the middle portions 32. However, in the actual structure, the elastic straps 18 (FIG. 8) can not apply such large force to the intermediate plate 5. Therefore, in the disengaging operation, when the pins 27 return through the clearance L and contact the flywheel ring 19, the intermediate plate 5 stops and does not contact the rear facing 9.

In order to move the intermediate plate 5 in the engaging direction E relatively to the pins 27, it is necessary to move the springs 28 toward other ends of the small diameter of the pins 27. In this case, the middle portions 32 elastically restore toward the free condition. Therefore, the intermediate plate 5 can easily move relatively to the pins 27 toward the flywheel 1, and there is not large frictional force at the sliding portions of the pins 27 and the middle portions 32. Consequently, when the engaging operation is performed with the worn facing, the intermediate plate 5 can move in the engaging direction E until it is strongly pressed onto the facing 8, and the pressing force applied from the pressure plate 2 to the intermediate plate 5 is not largely reduced by the sliding resistance between the pins 27 and the springs 28.

According to the invention, as described above, since the intermediate plate 5 can smoothly move only in the engaging direction E relatively to the pins 27, the pressing force applied from the intermediate plate 5 to the facing 8 is not substantially reduced even when the facing 8 wears, and thus, the facing 8 can be pressed to the flywheel 1 by the sufficiently large force to transmit the sufficient torque from the flywheel 1 to the facing 8. In the disengaging operation, the excessive returning of the intermediate plate 5 can be prevented.

The present invention can be modified as follows.

Referring to FIG. 3, the holes 25 and pins 27 have constant diameters through their whole lengths, respectively. A stopper spring 35, which is shaped to cover the outer periphery and both sides of the projection 15, is fixed to each projection 15. Stopper pins 27 are fitted into apertures 36 at both side portions of the springs 35, and extend therethrough toward the flywheel 1 and the flywheel ring 19, respectively. As shown in FIG. 4, each spring 35 is provided at the peripheral portions of the apertures 36 with radial lips 37 divided by radial slits or slots. As shown in FIG. 3, the inserted pins 27 radially outwardly deflect the lips 37, and each group of the annularly arranged lips 37 are deflected into a tapered shape projecting toward the flywheel ring 19.

According to this embodiment, in order to move the intermediate plate 5 in the disengaging direction D relatively to the pins 27, it is necessary to deform the lips 37 so that the diameter of the holes 36 may reduce, i.e., the engaging force against the pins 27 may increase, which results in a large sliding resistance. Therefore, in an actual structure, such movement of the plate 5 can surely be prevented. In order to move the intermediate plate 5 in the engaging direction E relatively to the pins 27, it is required only to deform the lips 37 so that the diameter of the holes 36 may increase, i.e., the pressing force against the pins 27 may reduce. Therefore, such deformation can be performed easily, and thus, the movement in the engaging direction E can be performed smoothly.

In an embodiment shown in FIG. 5, volute springs 40 (stopper springs) are arranged between the inner surfaces of the holes 25 and the pins 27. The shape of the volute spring 40 is clearly illustrated in FIG. 6. As shoen in FIG. 5, each pin 27 is provided at an end near the flywheel ring 19 with an annular groove, into which an end of a small diameter of the volute spring 40 is fitted. Other end of the large diameter of each spring 40 is frictionally engaged with the inner surface of the hole 25.

In this embodiment, in order to move the intermediate plate 5 in the disengaging direction D relatively to the pins 27, the pins 27 should move relatively to the springs 40 so that the pins 27 may deflect the volute spring 40 and may increase the diameter thereof. In this case, the volute spring 40 is strongly pressed to the inner surface of the hole 25, and thus, a large frictional resistance occurs between the inner surface of the holes 25 and the pins 27. Therefore, in the actual structure, such movement of the plate 5 can surely be prevented. When the intermediate plate 5 is forced to move in the engaging direction E relatively to the pins 27, the pins 27 deform the springs 40 and reduce the diameter thereof. Therefore, the frictional resistance between the inner surface of the holes 25 and the spring 40 reduces, and thus, the intermediate plate 5 can smoothly move in the engaging direction E.

Since, in the embodiments in FIGS. 3 to 6, the intermediate plate 5 can smoothly move only in the engaging direction E, same advantages as those of the embodiment of FIGS. 1 and 2 can be obtained.

Although the invention has been described in its preferred form with a certain degree or particularity, it is understood that the present disclosure of the preferred form may be changed in the details of construction and the combination, and arrangement of parts may be resorted to without departing from the spirit and scope of the invention as hereinafter claimed.

What is claimed is:

1. A device for adjusting a clearance of a twin clutch comprising:
   a flywheel;
   a pressure plate;
   two clutch discs interposed between the flywheel and the pressure plate;
   an intemediate plate disposed between the clutch discs;
   a stopper pin parallel to a clutch engaging and disengaging direction;
   a stopper spring associated to the intermediate plate for connecting the stopper pin to a radially outer portion of the intermediate plate; and
   a support member opposed to the flywheel with the stopper pin therebetween;
   said stopper spring being so adapted that it allows a movement of the stopper pin toward the support member relatively to the intermediate plate, and prevents a movement of the stopper pin in the opposite direction relatively to the intermediate plate; said stopper spring being of cylindrical shape and having both end of a large diameter and an axially middle portion of a small diameter which is provided with circumferentially spaced slits, said stopper pin having and outer peripheral surface of a tapered shape, with its diameter becoming smaller toward an end at the flywheel side, both ends of the stopper spring being fixedly fitted into a hole at the outer peripheral portion of the intermediate plate, and said middle portion being elastically pressed onto the outer periphery of the stopper pin.

2. A device of claim 1, wherein a radially inward flange is formed at an end, adjacent to the flywheel, of the inner surface of the hole in the intermediate plate, and the stopper spring contacts said inward flange and is prevented from moving toward the flywheel.

3. A device for adjusting a clearance of a twin clutch comprising:
   a flywheel;
   a pressure plate;
   two clutch discs interposed between the flywheel and the pressure plate;
   an intermediate plate disposed between the clutch discs;
   a stopper pin parallel to a clutch engaging and disengaging direction;
   a stopper spring associated to the intermediate plate for connecting the stopper pin to a radially outer portion of the intermediate plate; and
   a support member opposed to the flywheel with the stopper pin therebetween;
   said stopper spring being so adapted that it allows a movement of the stopper pin toward the support member relatively to the intermediate plate, and prevents a movement of the stopper pin in the opposite direction relatively to the intermediate plate;
   wherein said stopper spring is provided with an aperture, through which the stopper pin extends, and radial lips around the aperture, and said stopper pin inserted into the aperture elastically deflects the lips into a tapered form projecting toward the support member; and
   said stopper spring is integrally provided with a portion covering the outer periphery of the intermediate plate and portions covering both side surfaces of the intermediate plate, and said aperture and lips are formed at each portion covering the side surfaces.

4. A device for adjusting a clearance of a twin clutch comprising:
   a flywheel;
   a pressure plate;
   two clutch discs interposed between the flywheel and the pressure plate;
   an intermediate plate disposed between the clutch discs;
   a stopper pin parallel to a clutch engaging and disengaging direction;
   a stopper spring associated to the intermediate plate for connecting the stopper pin to a radially outer portion of the intermediate plate; and
   a support member opposed to the flywheel with the stopper pin therebetween;
   said stopper spring being so adapted that it allows a movement of the stopper pin toward the support member relatively to the intermediate plate, and prevents a movement of the stopper pin in the opposite direction relatively to the intermediate plate; and
   wherein said stopper spring is formed by a volute spring, of which end of a large diameter is positioned nearer to the flywheel than the other end of a small diameter thereof, said large diameter end is frictionally and elastically fitted into an inner periphery of a hole in the intermediate plate, said small diameter end is fixed to the stopper pin, and the spring is adapted to reduce the large diameter of said end, only when an axial tension is applied to the spring, so as to allow a movement of the spring relatively to the inner surface of the hole.

5. A device of claim 4 wherein said small diameter end of the spring is fitted into an annular groove provided at the outer peripheral surface of the stopper pin.

* * * * *